United States Patent [19]
Bogusz et al.

[11] Patent Number: 5,203,009
[45] Date of Patent: Apr. 13, 1993

[54] RADIO TRANSCEIVER HAVING FIXED CALLING CAPACITY

[75] Inventors: Anthony J. Bogusz, Harwood Heights, Ill.; J. Robert Sroka, Sutton Scotney, England; Donald A. Dorsey, Arlington Heights, Ill.

[73] Assignee: Motorola, Inc., Schaumburg, Ill.

[21] Appl. No.: 810,271

[22] Filed: Dec. 19, 1991

[51] Int. Cl.⁵ .............................................. H04Q 7/02
[52] U.S. Cl. .................................... 455/33.1; 379/37; 455/56.1; 455/186.1
[58] Field of Search ............... 379/37, 38, 39, 40, 379/51, 52; 455/89, 33.1, 54.1, 56.1, 186.1, 186.2

[56] References Cited
PUBLICATIONS

FCC File #31010/EQU 17.9; Oct. 20, 1989, pp. 1-4, 32-33.

Primary Examiner—Reinhard J. Eisenzopf
Assistant Examiner—Philip Sobutka
Attorney, Agent, or Firm—Robert H. Kelly

[57] ABSTRACT

A cellular phone having a fixed calling capacity limiting use of the phone to emergency situations. Two call sequences are stored in memory permitting telephonic communication with only the two fixed sites associated with the two call sequences. Telephonic communication must be effectuated with a first fixed site, and then terminated, prior to effectuation of telephonic communication with a second fixed site. Telephonic communication with a second fixed site is permitted during a predetermined, limited time period.

18 Claims, 7 Drawing Sheets

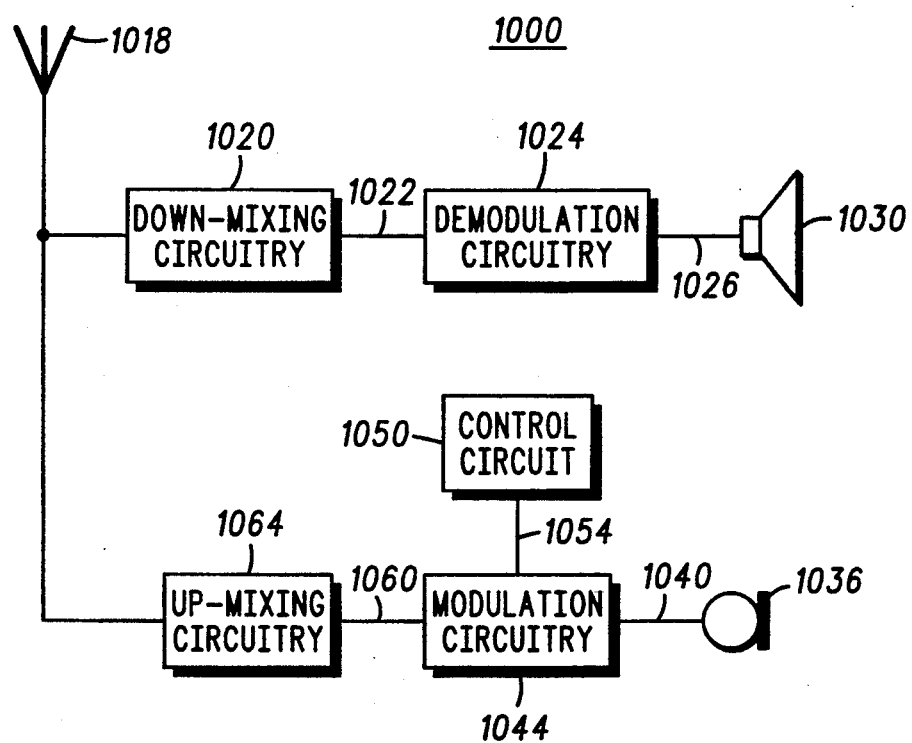

RADIO TRANSCEIVER HAVING FIXED CALLING CAPACITY

BACKGROUND OF THE INVENTION

The present invention relates generally to radio transceivers operative in a cellular, communication system, and, more particularly, to a radio transceiver, and associated method therefor, having a fixed calling capacity.

A communication system is operative to transmit information (referred to hereinbelow as an "information signal") between two or more locations, and includes, at a minimum, a trasmitter and a receiver interconnected by a communication channel. A radio communication system is a communication system in which the transmission channel comprises a radio-frequency channel wherein the radio-frequency channel is defined by a range of frequencies of the communication spectrum.

The transmitter, which forms a portion of a radio communication system, includes circuitry for converting the information signal into a form suitable for transmission thereof upon a radio-frequency channel. Such circuitry includes modulation circuitry which performs a process referred to as modulation. In such a process, the information signal which is to be transmitted is impressed upon a radio-frequency electromagnetic wave.

The radio-frequency electromagnetic wave upon which the information signal is impressed is of a frequency within a range of frequencies defining in the radio-frequency channel upon which the information is to be transmitted. The radio-frequency, electromagnetic wave is commonly referred to as a "carrier signal," and the radio-frequency, electromagnetic wave, once modulated by the information signal, is commonly referred to as a modulated signal.

Various modulation schemes are known for impressing the information signal upon the carrier signal to form thereby the modulated signal. For instance, amplitude modulation, frequency modulation, phase modulation, and combinations thereof are all modulation schemes by which an information signal may be impressed upon a carrier wave to form a modulated signal.

Radio communication systems are advantageous in that no physical interconnection is required between the transmitter and the receiver; once the information signal is modulated to form a modulated signal, the modulated signal may be transmitted over large distances.

A two-way, radio communication system is a radio communication system, similar to the radio communication system described above, but which further permits both transmission of information to a remote location and reception of information transmitted by a transmitter located at the remote location. Each location of such two-way, radio communication system contains both a transmitter and a receiver. The transmitter and receiver positioned at a single location typically comprise a unit referred to as a radio transceiver, or, more simply, a transceiver.

A cellular, communication system is one type of radio communication system. Radio transceivers (conventionally referred to as radiotelephones or cellular phones) operative in such a cellular, communication system contain circuitry permitting simultaneous generation and reception of modulated signals. Two-way communication between a radiotelephone and remotely-located transceivers is thereby permitted. The remotely-located transceivers, referred to as "base stations", are physically connected to a conventional telephonic network to permit communication between a radiotelephone and a fixed site of a conventional, telephonic network. (A fixed site of the conventional, telephonic network may also, of course, comprise a base station capable of transmitting modulated signals to a radio transceiver —thereby permitting communication between two radio transceivers.) A cellular, communication system is formed by positioning numerous base stations at spaced-apart locations throughout a geographical area. Each base station contains circuitry to receive modulated signal transmitted thereto by one, or many, radiotelephones.

A frequency band of the electromagnetic frequency spectrum (in the United States extending between 800 megahertz and 900 megahertz) is allocated for radiotelephone communication upon a cellular, communication system. The allocated frequency band is further divided into a plurality of transmission channels of defined bandwidths. Modulated signals generated by radiotelephones are transmitted upon selected ones of the transmission channels defined thereon. Similarly, modulated signals generated by the base stations are also transmitted upon selected ones of the transmission channels defined upon such frequency band.

Radiotelephones operative in such a cellular, communication system have been designed to be of many types of constructions. Most of such radiotelephone construction may be classified as being of two general construction-types, namely, a construction-type generically referred to as a "mobile phone" and a construction type generically referred to as a "portable phone". (A third construction-type, generically referred to as a "transportable phone", has many of the characteristics of a portable phone, and will be considered hereinbelow as such.)

A mobile phone is designed to be mounted fixedly in a motor vehicle. A mobile phone is advantageous in that such a phone may be conveniently powered by the power supply of the motor vehicle in which the mobile phone is mounted. Additionally, because of such fixed positioning of the mobile phone in a motor vehicle, additional apparatus may be mounted in such motor vehicle to facilitate usage of such mobile phone by a user during operation of the motor vehicle. Of course, as such a mobile phone is typically fixedly mounted in such motor vehicle, portability of such a mobile phone is oftentimes limited.

A portable phone, conversely, is of reduced physical dimensions, thereby to permit convenient carriage of such a portable phone on the person of a user thereof. However, a portable power supply (typically a rechargeable battery) must be carried with the portable phone to permit operation of such phone. And, such portable power supply is of finite energy storage capacity which limits the operational period of the portable phone.

Use of a radiotelephone, of either construction-type, in a cellular, communication system permits the user to communicate telephonically without any fixed connection to a conventional telephonic network. Calls may be initiated by the user, or calls may be initiated by another, and received by the user made to the user, similar to telephonic communication in a conventional, wireline telephonic network. Use of such transceivers may for example, increase the productivity of a user, allowing the user to communicate telephonically during times when the user would otherwise be unable to communicate telephonically upon a conventional, wireline network (such as, e.g., when the user is operating a motor vehicle, waiting in an airport, etc.).

Use of such a radiotelephone in a cellular, communication system is perhaps of greatest benefit in the event of emergency, as such a radio transceiver may be used to report, for example, roadside breakdowns, emergency roadside conditions, or other emergency conditions. In essence, when used in such situations, the radiotelephone is operative as a security device.

Many potential users of a cellular, communication system would be eager to have available a radiotelephone for use as a security device, but not require a radiotelephone for other purposes.

If a radiotelephone is used solely as a security device, the radiotelephone would be actually operated only sporadically. Such minimal operation of the radiotelephone if used solely as a security device would result in a negligible increase in usage of a cellular, communication system.

Such usage of a cellular, communication system is commonly referred to as the "load" upon the system. The "loading" upon a cellular, communication system determines the number, and location, of base stations required to permit usage of the cellular, communication system by users desiring to communicate thereon at any given time. Because a radiotelephone operative only as a security device would be used only rarely, large numbers of users of such radiotelephones operative only as security devices would not result in significant increase in the "loading" of an existing, cellular, communication system. Accordingly, there would be little likelihood of an existing, cellular, communication system reaching, or exceeding, full capacity of usage thereof as a result of even very large increases in numbers of users of the cellular, communication system, if such additional users operate radiotelephones only as security devices.

Such users, however, could not be permitted to operate such radiotelephones except as security devices without increasing the "loading" of an existing, cellular, communication system.

What is needed, therefore, is a radiotelephone construction capable of use solely as a security device.

SUMMARY OF THE INVENTION

The present invention, accordingly, advantageously provides a radiotelephone construction operative as a security device.

The present invention further advantageously provides a radiotelephone having a fixed calling capacity.

The present invention yet further advantageously provides a method for effectuating, sequentially, telephonic communication with a limited number of fixed sites of a wireline, telephonic network.

The present invention includes further advantages and features, the details of which will be better understood by reading the following detailed description of the preferred embodiments hereinbelow.

In accordance with the present invention, therefore, a radio transceiver, and associated method, is disclosed. The radio transceiver is operative in a cellular, communication system comprised of a plurality of base stations coupled to a wireline network having fixed sites connected thereto, with each of the fixed sites being associated with a particular call sequence. The radio transceiver comprises transmitter circuitry for generating and transmitting a modulated signal. A first call sequence is stored in a first memory location, and a second call sequence is stored in a second memory location. A signal representative of the first call sequence stored in the first memory location is supplied to the transmitter circuitry to initiate transmission of a modulated signal representative of the first call sequence, thereby to effectuate telephonic communication with the first site. A signal representative of the second call sequence stored in the second memory location is supplied to the transmitter circuitry to initiate transmission of a modulated signal representative of the second call sequence, thereby to effectuate telephonic communication with the second fixed site only after effectuation of telephonic communication between the radio transceiver and the first fixed site, and termination of telephonic communication therewith.

BRIEF DESCRIPTION OF THE DRAWINGS

The present invention will be better understood when read in light of the accompanying drawings in which;

FIGS. 6-1 and 6-2 are flow diagrams of an algorithm embodying the method of a preferred embodiment of the present invention; and FIG. 7 is a block diagram of circuitry forming a radiotelephone of a preferred embodiment of the present invention.

DESCRIPTION OF THE PREFERRED EMBODIMENTS

Figure 1:
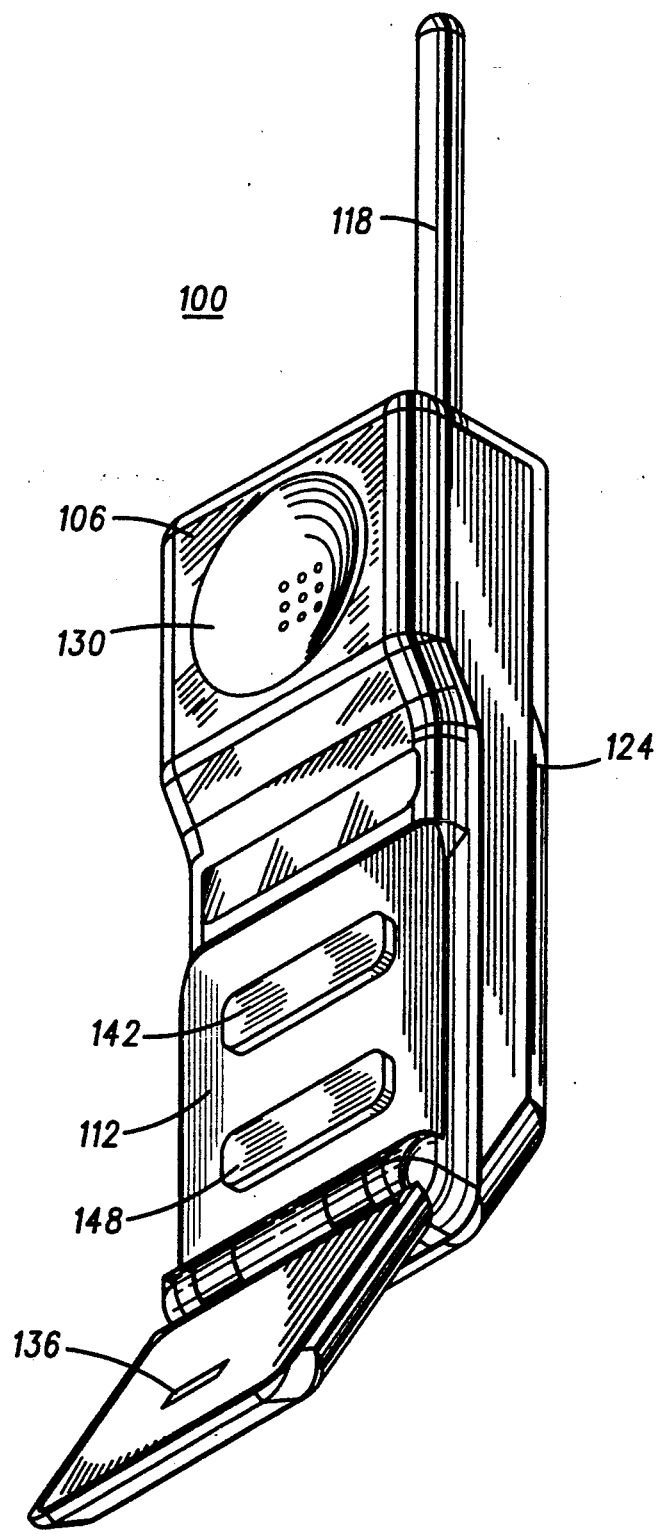
FIG. 1 is a schematic representation of a portable radio telephone of a preferred embodiment of the present invention.

Referring first to the schematic representation of FIG. 1, a radio transceiver, referred to generally by reference numeral 100, of a preferred embodiment of the present invention is shown. The radio transceiver shown therein is of the construction-type, as noted hereinabove, referred to generically as a "portable phone", and will be referred to as such hereinbelow.

Portable phone 100 includes housing 106 enclosing circuitry therewithin. Face surface 112 forms a portion of the housing 106. Antenna 118 protrudes beyond a top surface of housing 106 and is electrically coupled to circuitry housed within housing 106, as is conventional. Battery 124 is releaseably affixed to housing 106 to be carried therewith to form the portable power supply to permit operation of the phone. While not shown, battery 124 is appropriately coupled to circuitry housed within housing 106 to power the circuitry housed therewithin during operation of phone 100. When battery 124 becomes depleted of stored energy, the battery may be removed and replaced with another battery to permit continued operation of the portable phone 100.

Speaker 130 is disposed at a top portion of face surface 112, and microphone 136 is disposed at a bottom portion thereof. While not shown in the figure, both speaker 130 and microphone 136 are appropriately coupled to circuitry housed within housing 106. Microphone 136 is operative to convert a voice signal into an electrical signal during operation of phone 100, and speaker 130 is operative to convert an electrical signal into an audio signal during operation of the phone.

First push button 142 and second push button 148 are also disposed upon face surface 112 of portable phone 100. Push buttons 142 and 148 are both preferably momentary switches.

As will be described hereinbelow, actuation of push button 142 causes operation of phone 100 to transmit a first call sequence (i.e., telephone number) to a base station of a cellular, communication system to effectuate telephonic communication with a fixed site of a telephonic network associated with the first call sequence. Actuation of push button 142 a second time, after telephonic communication has been effectuated, causes termination of communication with the first fixed site.

After telephonic communication with the fixed site of the telephonic network associated with the first call sequence has been effectuated and such telephonic communication has been terminated (either by actuation of push button 142 a second time, or by termination of communication at the first fixed site), actuation of push button 148 causes operation of phone 100 to transmit a second call sequence (i.e., telephone number). The second call sequence is transmitted to a base station of a cellular, communication system to effectuate telephonic communication with a fixed sited associated with the second calling sequence.

Actuation of push button 148 prior to actuation of push button 142, and prior to effectuation of telephonic communication with the fixed sited associated with the first call sequence does not cause initiation of telephonic communication with the second fixed site. Thereby, telephonic communication is permitted between phone 100 and the second fixed site only after communication has been effectuated with the first site.

In a preferred embodiment, however, actuation of push button 148 prior to actuation of push button 142 is operative to cause circuitry housed with housing 106 to measure voltage levels of the electrical current supplied to the transmitter circuitry by battery 124. The circuitry housed within housing 106 causes annunciation of an audio alarm by speaker 130 when the measured voltage levels of battery 124 are less than a predetermined level. That is to say, actuation of push button 148 in such a manner is operative to an initiate a battery testing routine which determines a battery charge state.

Figure 2:
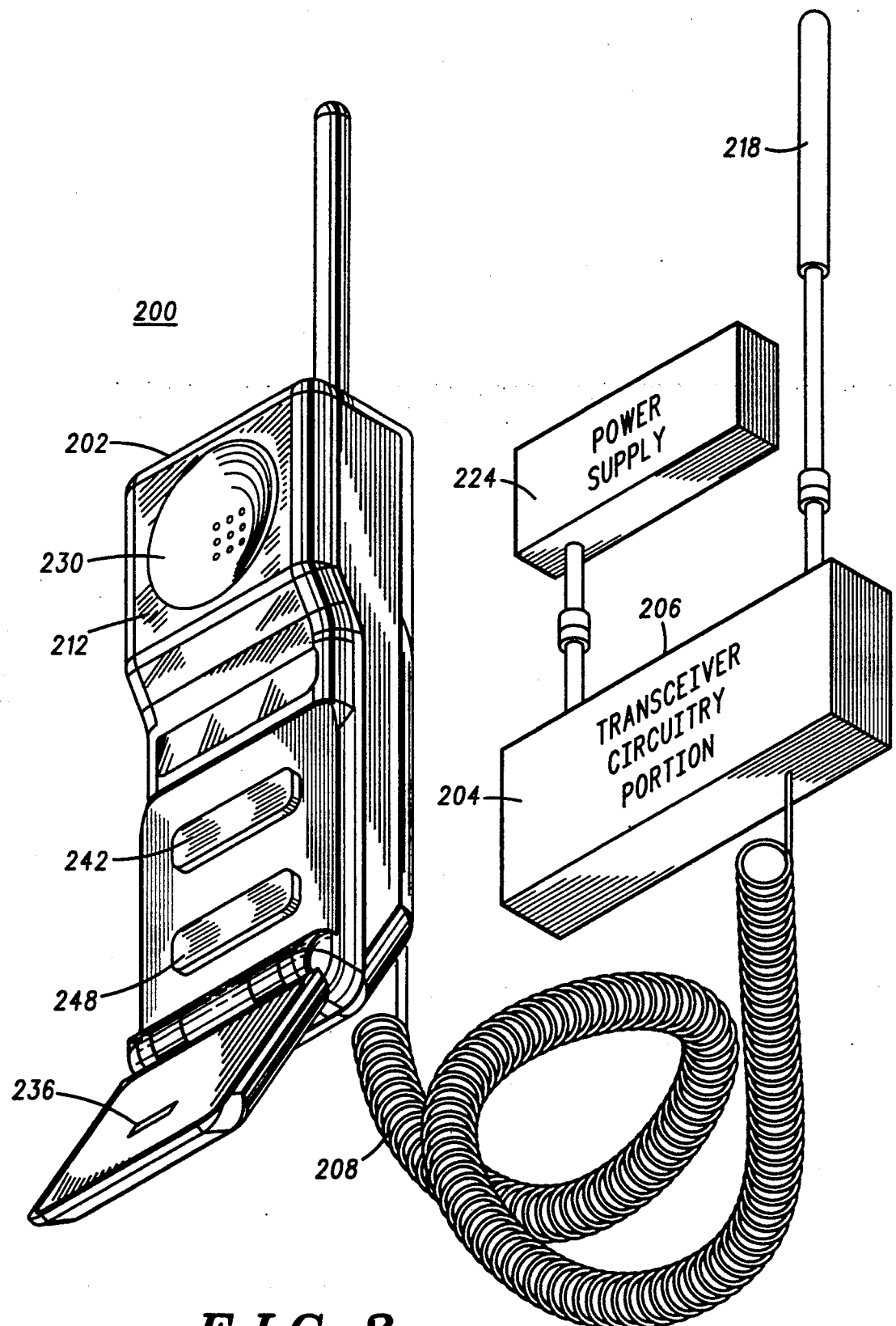
FIG. 2 is a partial schematic, partial block diagram, of a mobile radiotelephone of another preferred embodiment of the present invention.

Turning next to the partial schematic, partial block, diagram of FIG. 2, of another radio transceiver, referred to generally by reference numeral 200, of an alternate, preferred embodiment of the present invention is shown. The radio transceiver shown in FIG. 2 is of the construction-type, as noted hereinabove, referred to generically as a "mobile phone", and will be referred to as such hereinbelow.

Mobile phone 200 is comprised of handset portion 202 and transceiver circuitry portion 204. Transceiver circuitry portion 204 is comprised of circuitry housed within housing 206. Handset portion 202 is coupled to transceiver circuitry portion 204 by way of cable 208. Face surface 212 comprises a portion of handset portion 202. Transceiver circuitry portion 204 is typically fixedly mounted in a motor vehicle, and handset portion 202 is typically positioned in the vehicular compartment of the motor vehicle.

Transceiver circuitry portion 204 is coupled to antenna 218, and to power supply 224. Typically, antenna 218 of mobile phone 200 is affixed at an external portion of a motor vehicle in which the mobile phone is mounted, and power supply 224 comprises the power supply of the motor vehicle in which the mobile phone is mounted.

Speaker 230 is disposed at a top portion (i.e., the earpiece) of face surface 212 of handset portion 202. Microphone 236 is disposed at a bottom portion thereof (i.e., the mouthpiece). Both speaker 230 and microphone 236 are appropriately coupled to the circuitry of transceiver circuitry portion 204 housed within housing 206 by way of cable 208.

Microphone 236 is operative to convert a voice signal into an electrical signal during operation of phone 200, and speaker 230 is operative to convert an electrical signal into an audio signal during operation of phone 200.

First push button 242 and second push button 248 are also disposed upon face surface 212 of handset portion 202. Push buttons 242 and 248 are also appropriately coupled to the circuitry of transceiver circuitry portion 204 by way of cable 208.

Operation of push buttons 242 and 248, similar to push buttons 142 and 148 of portable phone 100 of FIG. 1, are both preferably comprised of momentary switches.

Actuation of push button 242 causes operation of phone 200 to transmit a first call sequence (i.e., telephone number) to a base station of a cellular, communication system to effectuate telephonic communication with a fixed site of a telephonic network associated with the first call sequence. Actuation of push button 242 a second time, after telephonic communication has been effectuated, causes termination of communication with the first fixed site.

After telephonic communication with the fixed site of the telephonic network associated with the first call sequence has been effectuated, and such telephonic communication has been terminated (either by actuation of push button 248 a second time, or by termination of communication at the first fixed site), actuation of push button 248 causes operation of phone 200 to transmit a second call sequence (i.e., telephone number). The second call sequence is transmitted to a base station of a cellular, communication system to effectuate telephonic communication with a fixed site associated with the second call sequence.

Actuation of push button 248 after telephonic communication has been effectuated with the fixed site associated with the second call sequence, causes termination of telephonic communication therewith.

Actuation of push button 248 prior to actuation of push button 242, and prior to effectuation of telephonic communication with the fixed site associated with the first call sequence does not cause initiation of telephonic communication with the second fixed site. Thereby, telephonic communication is permitted between phone 200 and the second fixed site only after communication has been effectuated with the first site.

In a preferred embodiment, however, actuation of push button 248 prior to actuation of push button 242 is operative to cause circuitry of transceiver circuitry portion 204 to initiate a battery testing routine.

Figure 3:
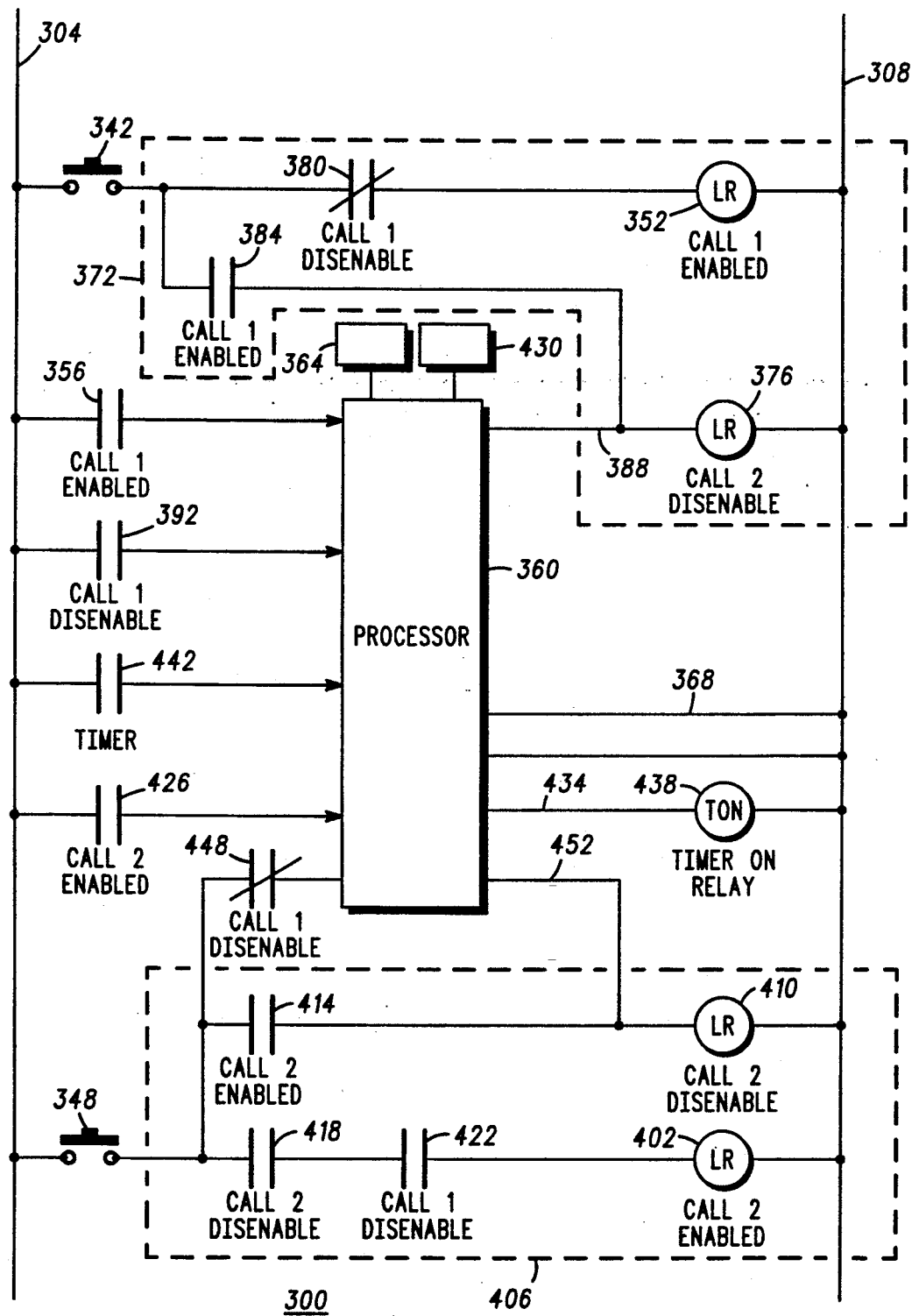
FIG. 3 is a circuit diagram of circuitry which forms a portion of the radiotelephones of either FIGS. 1 or 2 in a preferred embodiment of the present invention.

Turning now to the circuit diagram of FIG. 3, a circuit, referred to generally by reference numeral 300, forming a portion of the circuitry of a preferred embodiment of the present invention, is shown. While circuit 300 is shown in ladder-logic form, it is to be understood, of course, that the logical sequences performed by such circuit may alternately be embodied in any of many types of control circuitry.

As is conventional, vertically extending-line 304 formed at the left-hand side portion of circuit 300 is coupled to a power supply, and vertically-extending line 308 formed at the right-hand side portion of circuit 300 is coupled to a ground connection. Push buttons 342 and 348 correspond to push buttons 142-148 and 242-248 of phones 100 and 200 of FIGS. 1 and 2, respectively.

Actuation of switch 342 initiates transmission of a first call sequence by transmitter circuitry of which circuit 300 forms a portion. Actuation of switch 348 initiates transmission of a second call sequence by such transmitter circuitry, but only after telephonic communication has been effectuated (and thereafter terminated) with a fixed site associated with first call sequence. Actuation of switch 348, however, (similar to actuation of switches 148 and 248 noted hereinabove) initiateS a battery testing routine to determine the charge state of a battery, such as battery 124 of FIG. 1.

As illustrated in the figure, actuation of switch 342 causes energization of call 1 enable relay 352. Contact 356 of relay 352 is coupled to an input of processor 360. Processor 360 is operative to access first memory location 364 and to generate a signal on bus 368 which is coupled to transmitter circuitry, not shown in the figure. The transmitter circuitry is operative to transmit a signal indicative of the call sequence stored in memory location 364. Memory location 364 is a non-alterable memory. That is, memory location 364 is of a design preventing alteration of the contents stored therein by an end-user of a radiotelephone incorporating such, and may be considered to be non-alterable memory. For instance, memory location 364 may be comprised of a conventional read only memory, an erasable, programmable read only memory, a one-time-programmable memory, etc.

Relay 352 is a latching relay, permitting switch 342 to be comprised of a momentary switch, and relay 352 forms a portion of a latch circuit, indicated by block 372, shown in hatch, and encompassing call 1 disenable relay 376 (also a latching relay), and contacts 380 and 384. The latch circuit encompassed by block 372 is conventional in nature, and operation of such will not be described in detail.

Line 388 connects an output of processor 360 to relay 376 to supply an output signal generated by the processor to the relay. Processor 360 generates a signal on line 388 to energize relay 376 after termination of telephonic communication with a fixed site associated with the first call sequence when the termination of telephonic communication with such fixed site is initiated by the fixed site. (Such detection is noted by processor 360 by way of bus 368.).

Switch 342 is also coupled to relay 376 (by way of contact 384). Actuation of switch 342 a second time also causes energization of relay 376. Contact 392 of relay 376 is coupled to an input of processor 360. Processor 360 is operative to generate a signal indicative of such actuation of switch 342 the second time on line 368 to cause termination of telephonic communication with the fixed site associated with the first call sequence.

After switch 342 has been actuated to initiate telephonic communication with a fixed site associated with the first call sequence, and such telephonic communication has been terminated, (either by actuating switch 342 a second time or by termination of communication at the first fixed site), switch 348 may be actuated to initiate transmission of telephonic communication with a second fixed site. Accordingly, actuation of switch 348 causes energization of call 2 enable relay 402. Relay 402 is a latching relay and forms a portion of a latch circuit, here indicated by block 406, shown in hatch. The latch circuit also includes relay 410 (also a latching relay), contacts 414, 418, and 422. Latch circuit 406 is also conventional in nature. It is noted that contact 422 is a contact of relay 376, and is included for purposes of interlocking.

Contact 426 of relay 402 is supplied to an input of processor 360 to cause processor 360 to access memory location 430 in which a second call sequence is stored. Processor 360 generates a signal on bus 368 indicative of such call sequence stored in memory location 430 to cause initiation of transmission of the second call sequence of transmitter circuitry, not shown in the figure. Memory location 430 is of a design permitting only limited alteration of the contents stored therein. For instance, location 430 may be comprised of an electrically-erasable, programmable read only memory wherein alteration of the contents of the memory is permitted only by personnel having appropriate equipment to make such alterations.

Processor 360 is also operative to generate a signal on line 434 to actuate timer relay 438. Timer relay 438 is a "timer-on" relay. Contact 442 of time relay 438 is also coupled to an input of processor 360. When the timer of timer relay 438 times out (and closes contact 442), processor 360 generates a signal on bus 368 to terminate telephonic communication with the fixed site associated with the second call sequence. Switch 348, positioned in line with relay 448 to an input of processor 360 to cause termination of telephonic communication with the second site when switch 348 is actuated a second time. Responsive to actuation of switch 348 a second time (before timer 438 times-out), processor 360 generates a signal on line 452 which is also coupled to relay 410 to cause termination of telephonic communication with the second fixed site.

In such manner, circuit 300 is operative to cause initiation of telephonic communication with a fixed site associated with a first call sequence when switch 342 is actuated. Once telephonic communication is effectuated with the first fixed site, such communication may be terminated by actuation of switch 342 a second time, or when processor 360 receives an indication that the communication has been terminated at the first fixed site. Actuation of switch 348 is operative to initiate telephonic communication with a second fixed site only after telephonic communication has been terminated with the first fixed site. Telephonic communication with the second fixed site is terminated by actuation of switch 348 a second time, when processor 360 receives indication that the communication has been terminated at the second fixed site, or when a predetermined time period has elapsed.

By storing a call sequence in memory location 364 corresponding to an emergency agency, such as a police department number, or other emergency number, operation of a phone incorporating circuit 300 is limited to use as a security device. Only after communication with such agency has been effectuated may communication with another fixed site be initiated.

Actuation of switch 342 (which energizes relay 352 to close contact 458 thereby) may also be utilized to for an on/off switch to provide power to power the transmitter/receiver circuitry of a radiotelephone encompassing such circuitry.

Figure 4:
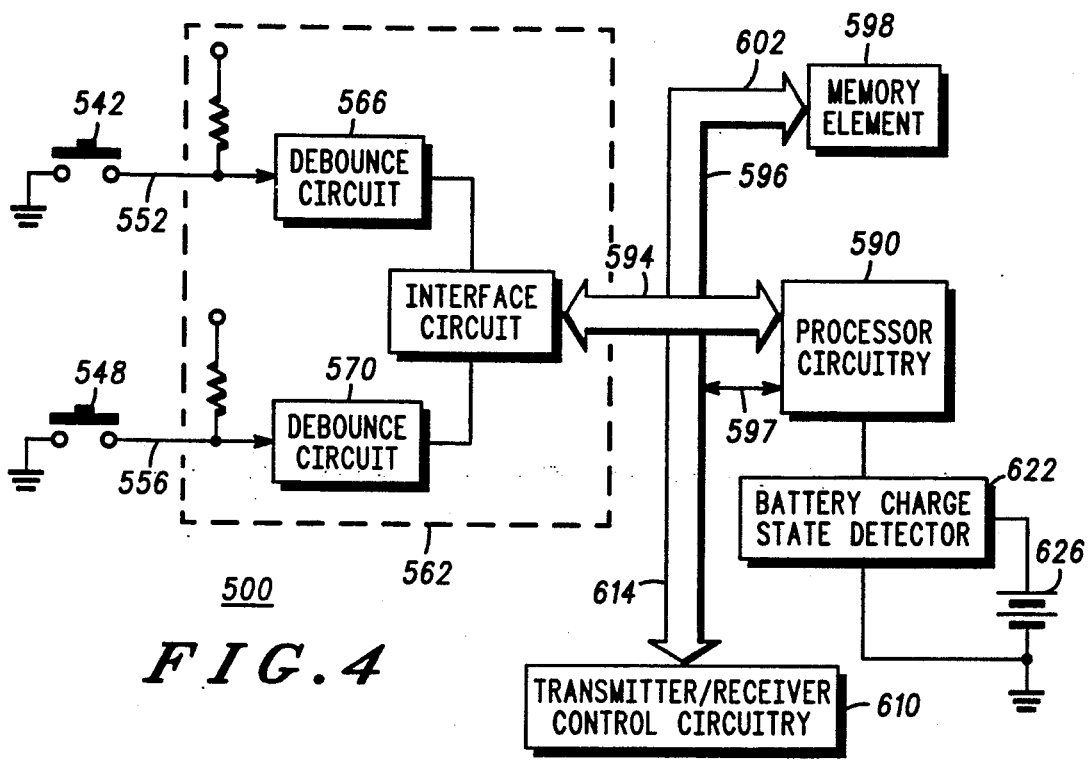
FIG. 4 is a circuit diagram of circuitry which forms a portion of the radiotelephone of either FIGS. 1 or 2 in an alternate, preferred embodiment of the present invention.

Turning now to the circuit diagram of FIG. 4, an alternate, preferred circuit, referred to generally by reference numeral 500, is shown. Circuit 500 is comprised of integrated circuits and preferably comprises a portion of the circuitry housed within housing 106 of phone 100 of FIG. 1, or a portion of the circuitry of transmitter circuitry portion 204 of phone 200 of FIG. 2. Push button switches 542 and 548 of circuit 500 correspond to switches 142-148 or 242-248 of the FIGS. 1 and 2, respectively. Lines 552 and 556 are coupled to inputs of integrated circuit chip 562 to provide indications of the times when switches 542 and 548, respectively, are actuated. Debounce circuits 566 and 570 form portions of chip 566, and are operative as latching circuits. Signals are generated on lines 574 and 578 responsive to times when switches 542 and 548, respectively, are actuated. Lines 574 and 578 are coupled to interface circuit 582 of chip 562.

System processor circuitry 590, e.g., Motorola processor 68HC11A8, is coupled by way of input/output lines 594 to the interface circuit 582.

Memory element 598 is also coupled to data bus 582, here by way of line 602. Memory element 598, analogous to memory locations 364 and 430 of circuit 300 of FIG. 3, is preferably comprised of an non-alterable portion and an alterable portion.

Bus 596 is coupled to processor 590 by way of line 597 and also to memory 598 by way of line 602. Bus 596 is further coupled to transmitter/receiver 610 by way of line 614.

Algorithms embodied within processor 590 cause first and second call sequences stored in memory element 598 to be accessed, and cause signals indicative of the values of such call sequences to be generated on line 614 and supplied to transmitter/receiver control circuitry 610.

Actuation of switch 542 causes a first call sequence stored in memory element 598 to be accessed, and a signal indicative of the values of such first call sequence to be generated on line 614 to transmitter/receiver control circuitry 610. Circuitry 610 initiates telephonic communication with a fixed site associated with the first call sequence.

Once communication is effectuated, and then terminated, with such fixed site, telephonic communication therebetween is permitted. Communication therebetween may be terminated by actuation of switch 542 a second time, or at the fixed site.

After telephonic communication has been effectuated, and then terminated, with the fixed site associated with the first call sequence, actuation of switch 548 causes a second call sequence stored in memory element 598 to be accessed, and a signal indicative of the values of such second call sequence are supplied to transmitter/receiver control circuitry 610 by way of line 614. Circuitry 610 initiates transmission of a signal to initiate communication with a fixed site associated with the second call sequence. Once telephonic communication is effectuated with the second fixed site, a timing algorithm is executed, to permit telephonic communication with the second fixed site for a predetermined period of time. Once such predetermined period of time has elapsed, communication with the second fixed site is terminated. Communication with the second fixed site may also be terminated by actuation of switch 548 a second time, or by termination of communication at the second fixed site.

Actuation of switch 548, prior to actuation of switch 542, may also be utilized to cause execution of a battery testing routine algorithm stored within processor 590. Processor 590 is operative, responsive to actuation of switch 548 in such manner, to generate a signal on line 618. Line 618 is coupled to battery charge state detector 622. Detector 622, in turn, is coupled across terminals of battery 626 to permit measurement of the charge state thereof when a signal is generated by processor 590 on line 618. When the battery charge state is determined to be less than a predetermined level, the algorithm causes appropriate annunciation to be made.

Figure 5:
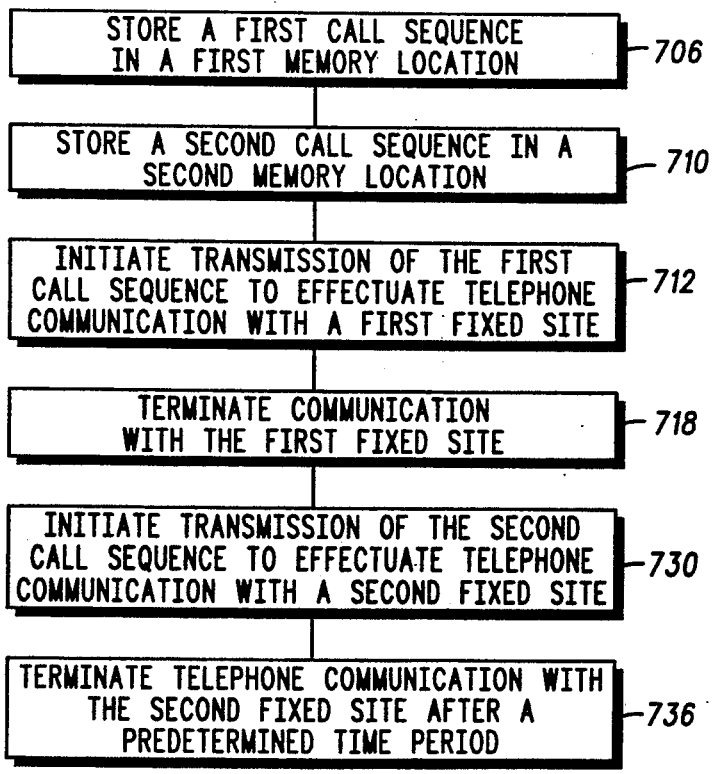
FIG. 5 is a flow diagram listing the method steps of a preferred embodiment of the present invention.

FIG. 5 is a logical flow diagram of the method, referred to generally by reference numeral 700, of a preferred embodiment of the present invention. First, and as indicated by block 706, a first call sequence is stored in a first memory location. Next, and as indicated by block 710, a second call sequence is stored in a second memory location. Next, and as indicated by block 712, transmission of the first call sequence by transmitter circuitry is initiated to effectuate telephonic communication with a fixed site associated with the first call sequence. Next, and as indicated by block 718, telephonic communication with the first fixed sited is terminated. Then, and as indicated by block 730, transmission of the second call sequence by the transmitter circuitry is initiated to effectuate telephonic communication with the second fixed site. The preferred embodiment of the present invention includes the further step, indicated by block 736, of terminating telephonic communication with the second fixed site a predetermined period of time after effectuation thereof. It is to be understood, of course, that several of the method steps, such as those indicated by blocks 706 and 710, may occur concurrently.

Figures 1, 6:
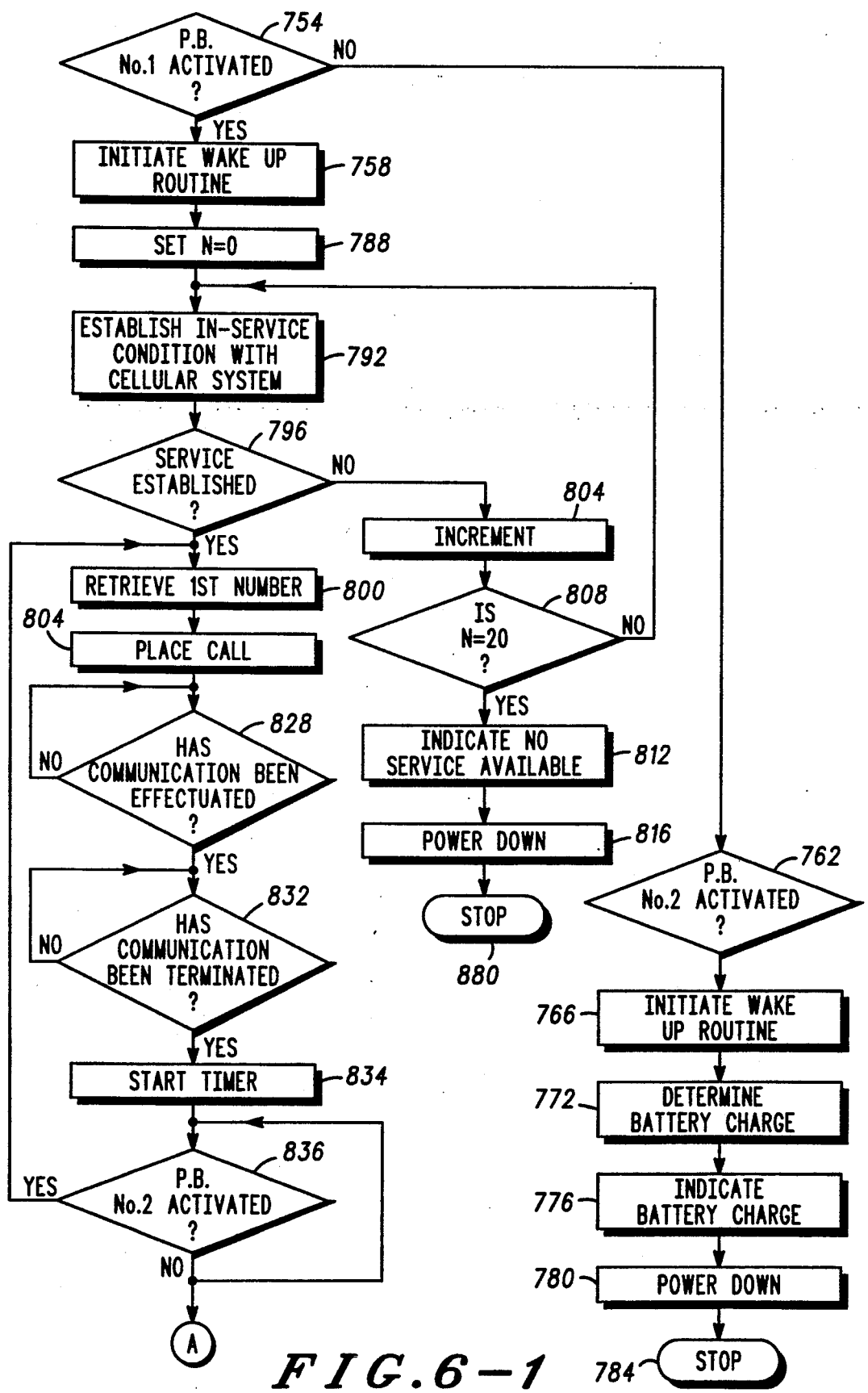
Figures 2, 6:
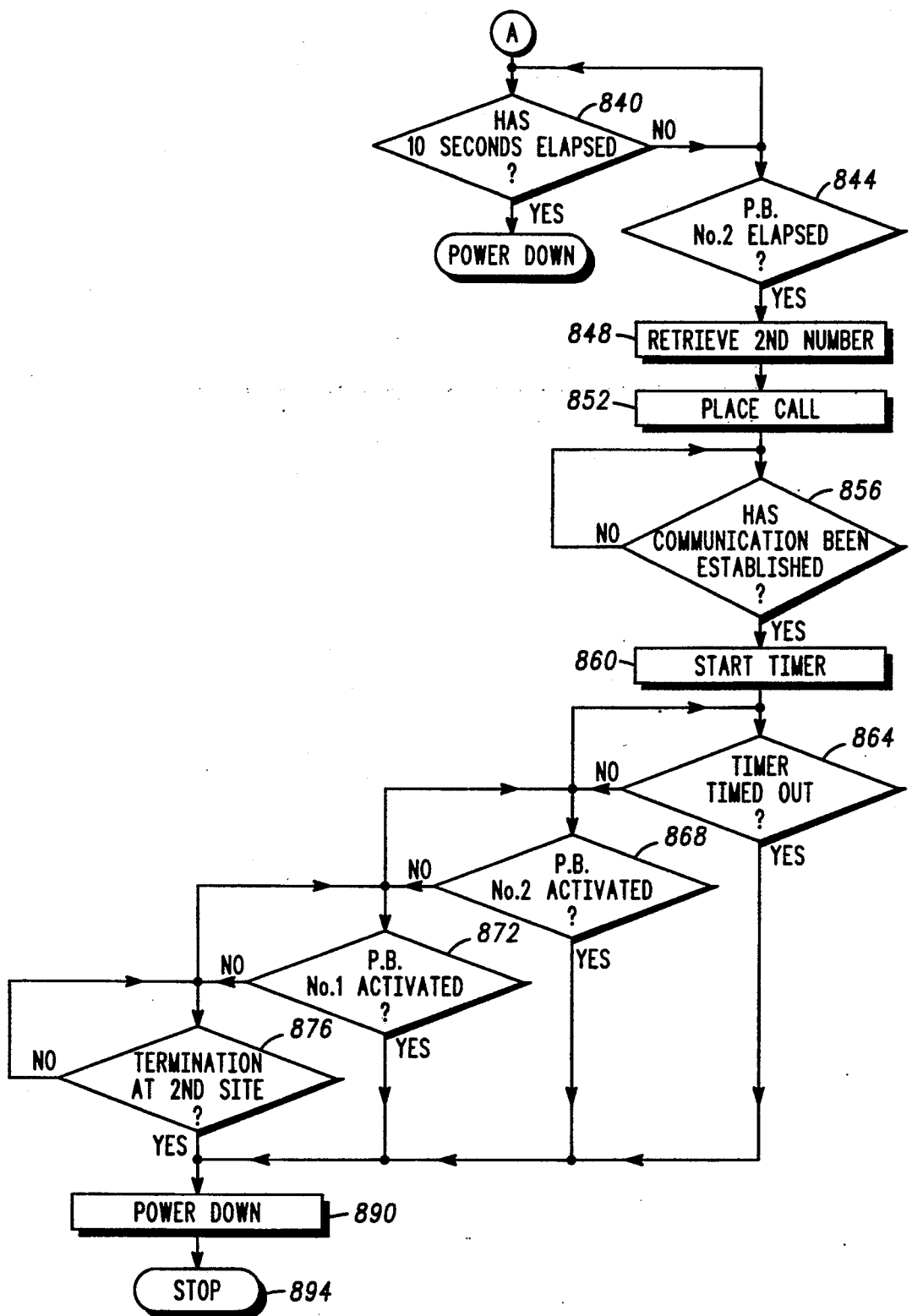

FIG. 6 is a flow diagram of an algorithm, referred to generally by reference numeral 750, embodying the method of a preferred embodiment of the present invention. Algorithms executing such a method (or portion of such method) may be contained within, for example, processor 360 of circuit 300 or processor 592 of circuit 500 of FIG. 4.

First, and as indicated by decision block 754, a determination is made as to whether a first push button has been actuated. If so, the yes branch is taken to block 758 and a wake-up routine is initiated. The wake-up routine sets circuitry to known states.

If the first push button has not been depressed, the no branch is taken to decision block 762 whereat a determination is made as to whether the second push button has been depressed. If so, the yes branch is taken to block 766 whereat a wake-up routine is initiated, and then to block 772 and the battery charge state of the battery is determined. Then, as indicated by block 776, the battery charge state is indicated and then the circuitry is powered-down, indicated by block 780, and the algorithm is terminated, indicated by stop block 784.

After the wake-up routine has been executed, an internal flag is set to zero, indicated by block 788, and an in-service condition with a base station of a cellular communication system is established, indicated by block 792. Next, and as indicated by decision block 796, a determination is made as to whether service can be established with the cellular communication system. If so, the yes branch is taken to block 800. If not, the no branch is taken, and five attempts are made to establish service with the cellular communication system, as indicated by blocks 804 and 808. If an in-service condition cannot be established with the cellular, communication system after five attempts, the yes branch is taken from decision block 808, a no-service available indication is made, indicated by block 812, the circuitry is powered down, indicated by block 816, and the algorithm is terminated, indicated by stop block 820.

When service can be established, a first call sequence is retrieved, indicated by block 800, the call sequence is transmitted to place the call thereby, indicated by block 804, and a determination is made as to whether or not telephonic communication has been effectuated (i.e., has the "land-talker" answered at the fixed-site), indicated by block 828. (It is to be understood, of course, that if communication can not be effectuated with the fixed site within a predetermined period of time, that such failure will be annunciated, and the phone will be powered down.) Once telephonic communication has been effectuated, the yes branch is taken to decision block 832 whereat a determination is made whether the telephonic communication has been terminated. Termination of communication can occur either at the fixed site, or by actuation of the first push button a second time. If so, the yes branch is taken to block 834 whereat a timer is started. Then a branch is taken to decision blocks 836, 840, and 844.

Determinations are made as to whether the first push button has been depressed again, whether an additional time period, here ten seconds, has elapsed, or whether a second push button has been depressed. If the first push button has been depressed again, the yes branch is taken from decision block 836 to block 800. If the predetermined time period has elapsed, and neither of the push buttons has been actuated, the yes branch is taken from decision block 840, and the circuitry of the cellular phone is powered down, indicated by block 844.

If the second push button has been actuated in the ten second interval, the yes branch is taken from decision block 844, a second call sequence is initiated, as indicated by block 848, the call sequence is transmitted to initiate telephonic communication with a fixed site associated with the second call sequence, indicated by block 852, and a determination is made, indicated by decision block 856, as to whether telephonic communication has been effectuated. (Similar to operation of decision block 832, it is to be understood that if communication can not be effectuated with the fixed site within a predetermined period of time, that such failure will be annunciated and the phone will be powered down.)

Once telephonic communication has been effectuated, a timer is started, as indicated by block 860, and determinations are made at decision blocks 864, 868, 872, and 876.

At decision block 864, a determination is made as to whether the timer has timed-out. At decision block 868, a determination is made as to whether the second push button has been actuated for a second time. At decision block 872, a determination is made as to whether the first push button has been again actuated. And, at decision block 876, a determination is made as to whether telephonic communication has been terminated at the second fixed site. If the timer has timed-out, either of the push buttons has been again actuated, or telephonic communication is terminated at the second fixed site, the yes branches are taken, and the circuitry powers down, as indicated by power down block 890. The algorithm then terminates, as indicated by block 894.

Turning finally now to the block diagram of FIG. 7, a radiotelephone, referred to generally by reference numeral 1000, of which the circuitry shown in FIGS. 3 or 4 forms a portion thereof, is illustrated. The circuitry of transceiver 1000, shown in block form, comprises the circuitry of phones 100 and 200 of FIGS. 1 and 2, respectively. Signals received by antenna 1018 of transceiver 1000 are supplied to down-mixing circuitry 1020, and down-mixed signals generated thereby on line 1022 are supplied to demodulation circuitry 1024. Demodulation circuitry 1024 generates demodulated signals on line 1026 which are supplied to a transducer, here speaker 1030.

The transmitter portion of radio transceiver 1000 comprises a transducer, here microphone 1036 which converts a voice signal into an electrical signal on line 1040 which is supplied to modulation circuitry 1044. Modulation circuitry is also coupled to control circuit 1050 by way of line 1054. Control circuit 1050 is equivalent to circuits 300 or 500 of FIGS. 3 or 4, respectively, and is operative to initiate telephonic communication, sequentially, to a first and, only thereafter, to a second fixed site. Modulation circuitry 1044 generates a modulated signal on line 1060 which is supplied to up-mixing circuitry 1064. Up-mixing circuitry is coupled to antenna 1018 permitting transmission of a modulated signal, at transmission frequency, therefrom.

A cellular phone constructed according to the teachings of the present invention may be advantageously utilized in emergency situations. For instance, the first call sequence may comprise an emergency telephone number, such as a 911 number, or a police department telephone number. Once telephonic communication is established with the relevant emergency bureau, and telephonic communication is terminated by either the user of the cellular phone, or the emergency bureau, the second push button may be actuated to initiate telephonic communication with a second location for a limited period of time. As telephonic communication with a fixed site associated with the second call sequence can only be effectuated after communication has been effectuated with an emergency bureau, use of the cellular phone is limited to emergency situations. As a result, the loading of an existing cellular, communication system is affected only minimally.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. In a cellular, communication system comprised of a plurality of base stations coupled to a wireline network having fixed sites connected thereto, a radio transceiver having transmitter circuitry operative to transmit a fixed number of call sequences to a base station of the cellular communication system to effectuate thereby telephonic communication between the radio transceiver and fixed sites of the wireline network associated with the call sequences transmitted by the transmitter circuitry, the combination with the transmitter circuitry of:

means forming a first memory location for storing a first call sequence therein;

means for initiating transmission by the transmitter circuitry of the first call sequence stored in the first memory location;

means forming a second memory location for storing a second call sequence therein; and means for initiating transmission by the transmitter circuitry of the second call sequence stored in the second memory location only after effectuation of telephonic communication between the radio transceiver and the first fixed site and termination of telephonic communication therebetween.

2. The combination of claim 1 further comprising means forming timer circuitry for timing time periods of telephonic communication between the radio transceiver and the second fixed site after effectuation of telephonic communication therebetween.

3. The combination of claim 2 further comprising means for terminating the telephonic communication between the radio transceiver and the second fixed site after the time period of telephonic communication between the radio transceiver and the second fixed site timed by the timer circuitry exceeds a predetermined value.

4. The combination of claim 1 wherein the first memory location formed by said means for storing the first call sequence comprises a non-alterable memory element.

5. The combination of claim 4 wherein the non-alterable memory comprises a read only memory.

6. The combination of claim 1 wherein the second memory location formed by said means for storing the second call sequence comprises an alterable memory element. comprises an alterable memory element.

7. The combination of claim 6 wherein the alterable memory element comprises an electrically-erasable, programmable, read only memory.

8. The combination of claim 1 wherein said means for initiating transmission of the first call sequence comprises processor circuitry having an algorithm embodied therein operative to: 1) access the first call sequence stored in the first memory location; and 2) supply a signal having values representative of the first call sequence to the transmitter circuitry.

9. The combination of claim 8 wherein the algorithm embodied in the processor circuitry is further operative to determine times when telephonic communication is effectuated between the radio transceiver and the fixed site associated with the first call sequence.

10. The combination of claim 9 wherein said means for initiating transmission of the second call sequence comprises processor circuitry having an algorithm embodied therein operative to: 1) access the second call sequence stored in the second memory location; and 2) supply a signal having values representative of the second call sequence to the transmitter circuitry.

11. The combination of claim 1 further comprising means for indicating times when transmission by the transmitter circuitry of the first call sequence initiated by the means for initiating transmission of the first call sequence fails to effectuate telephonic communication between the radio transceiver and the fixed site associated with the first call sequence.

12. The combination of claim 1 further comprising means for terminating telephonic communication between the radio transceiver and the fixed site associated with the first call sequence.

13. The combination of claim 1 further comprising means for terminating telephonic communication between the radio transceiver and the fixed site associated with the second call sequence.

14. A radio transceiver operative in a cellular communication system comprised of a plurality of base stations coupled to a wireline network having fixed sites connected thereto, each of the fixed sites being associated with a particular call sequence, said radio transceiver comprising:

transmitter circuitry for generating and transmitting a modulated signal;

means forming a first memory location for storing a first call sequence therein;

means for supplying a signal representative of the first call sequence stored in the first memory location to the transmitter circuitry to initiate transmission of a modulated signal representative of the first call sequence, thereby to effectuate telephonic communication with the first fixed site;

means forming a second memory location for storing a second call sequence therein;

means for supplying a signal representative of the second call sequence stored in the second memory location to the transmitter circuitry to initiate transmission of a modulated signal representative of the second call sequence, thereby to effectuate telephonic communication with the second fixed site only after effectuation of telephonic communication between the radio transceiver and the first fixed site and termination of telephonic communication therewith; and means for supplying power to the transmitter circuitry.

15. The radio transceiver of claim 14 further comprising means for measuring voltage levels of the means for supplying power.

16. The radio transceiver of claim 15 further comprising annunciator means for annunciating times when the voltage levels measured by the means for measuring are less than predetermined levels.

17. In a radio transceiver having transmitter circuitry and receiver circuitry, and operative in a cellular communication system comprised of a plurality of base stations coupled to a wireline network having fixed sites connected thereto, a method for effectuating, sequentially, telephonic communication between the radio transceiver and first and second fixed sites, the first and second fixed sites being associated with first and second call sequences, respectively, said method comprising the steps of:

storing a first call sequence in a first memory location;

storing a second call sequence in a second memory location;

initiating transmission of the first call sequence stored in the first memory location by the transmitter circuitry of the radio transceiver to effectuate thereby telephonic communication between the radio transceiver and the first fixed site;

terminating telephonic communication between the radio transceiver and the first fixed site; and initiating transmission of the second call sequence stored in the second memory location by the transmitter circuitry of the radio transceiver to effectuate thereby telephonic communication between the radio transceiver and the second fixed site only after effectuation of the telephonic communication between the radio transceiver and the first fixed site and termination of telephonic communication therebetween.

18. The method of claim 17 comprising the further step of terminating telephonic communication between the radio transceiver and the second fixed site a predetermined period of time after effectuation of the telephonic communication between the radio transceiver and the second fixed site.

* * * * *